Jan. 10, 1956

R. P. PIPEROUX ET AL 2,730,175

PUNCH FOR AUTOMATICALLY LOCATING
THE APERTURES IN A JET-CUP

Filed Sept. 29, 1950

INVENTORS.
RENE P. PIPEROUX
ARPAD P. BERGER
FERDINAND P. DIEMER
BY
ATTORNEYS.

INVENTORS.
RENE P. PIPEROUX
ARPAD P. BERGER
FERDINAND P. DIEMER
BY
ATTORNEYS.

FIG.12.

2,730,175
Patented Jan. 10, 1956

2,730,175

PUNCH FOR AUTOMATICALLY LOCATING THE APERTURES IN A JET-CUP

Rene P. Piperoux, Radburn, N. J., and Arpad P. Berger, New York, and Ferdinand P. Diemer, Woodhaven, N. Y., assignors to Celanese Corporation of America, New York, N. Y., a corporation of Delaware Application September 29, 1950, Serial No. 187,426

6 Claims. (Cl. 164—87)

This invention relates to machine tools and relates more particularly to an automatic punch for locating the apertures in a jet-cup and to the positioning and control mechanisms employed therein.

In the spinning of artificial multi-filament materials such as yarn, tow and the like, a filament-forming material is forced into a coagulating medium through a jet-cup or spinneret having as many apertures therein as it is desired to have filaments in the multi-filament materials. Ordinarily, the apertures in the jet-cup are arranged in the form of concentric circles, each of which circles may contain a different number of uniformly spaced apertures therein. To obtain multi-filament materials of the greatest uniformity and having the most desirable properties, the apertures in the jet-cup must be located accurately both with respect to each other and with respect to the periphery of said jet-cup. Since there may be a total of several hundred, or, in certain cases, several thousand apertures in a jet-cup, the accurate location of said apertures by manually operated apparatus requires a great deal of time and effort.

It is an important object of this invention to provide a machine tool which will be free from the foregoing and other disadvantages, and which will be especially simple in construction and efficient in operation.

A further object of this invention is to provide a punch which will operate automatically to locate the apertures in a jet-cup.

Another object of this invention is to provide a novel positioning mechanism which may be employed in connection with a punch to position a jet-cup for the location of apertures therein.

A still further object of this invention is to provide a novel control mechanism which may be employed in connection with a punch to control the movements of a jet-cup for the location of apertures therein.

Other objects of this invention, together with certain details of construction and combinations of parts, will be apparent from the following detailed description and claims.

According to the present invention, there is provided a machine tool such as a punch comprising a hydraulic press, of a type well known in the art, which is designed so that the press plunger will move up and down continuously during operation. The press plunger carries a tool such as a punch point, which, on each downstroke of the press plunger, contacts the work piece or jet-cup and forms a conical indentation therein. The jet-cup is supported beneath the punch point on an anvil to which is operatively connected a positioning mechanism which will move the jet-cup so that the successive punches therein will be located accurately both with respect to each other and with respect to the periphery of the jet-cup. In addition, there is provided a control mechanism which may be set to provide any desired number and arrangement of punches in the jet-cup and which will stop the operation of the punch after the punching of a jet-cup is completed. The punched jet-cup is then finished by drilling therethrough apertures of any desired diameter at the points indicated by the punches therein, the drilling being effected in the usual manner by a manually operated drill press.

A preferred embodiment of this invention is shown in the accompanying drawings wherein.

Press

Figure 1:
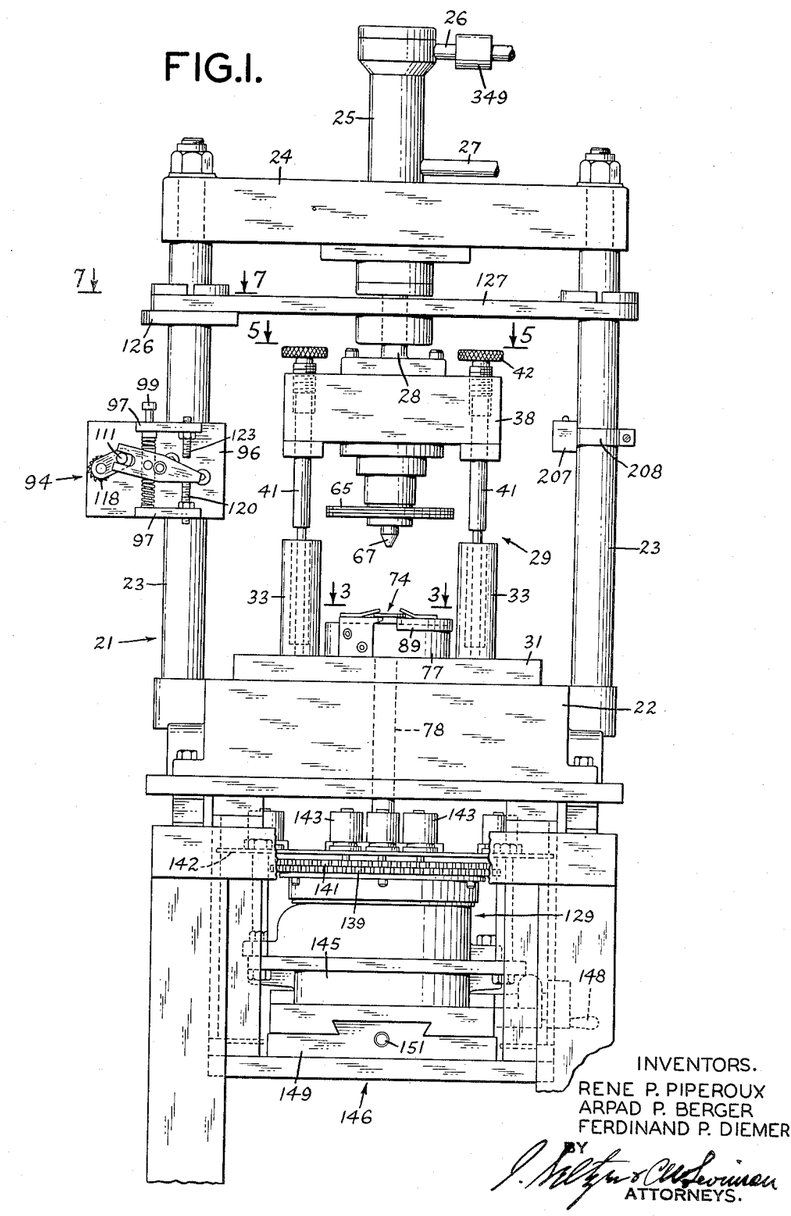
Fig. 1 is a front elevational view of the punch.
Figures 2, 3, 4:
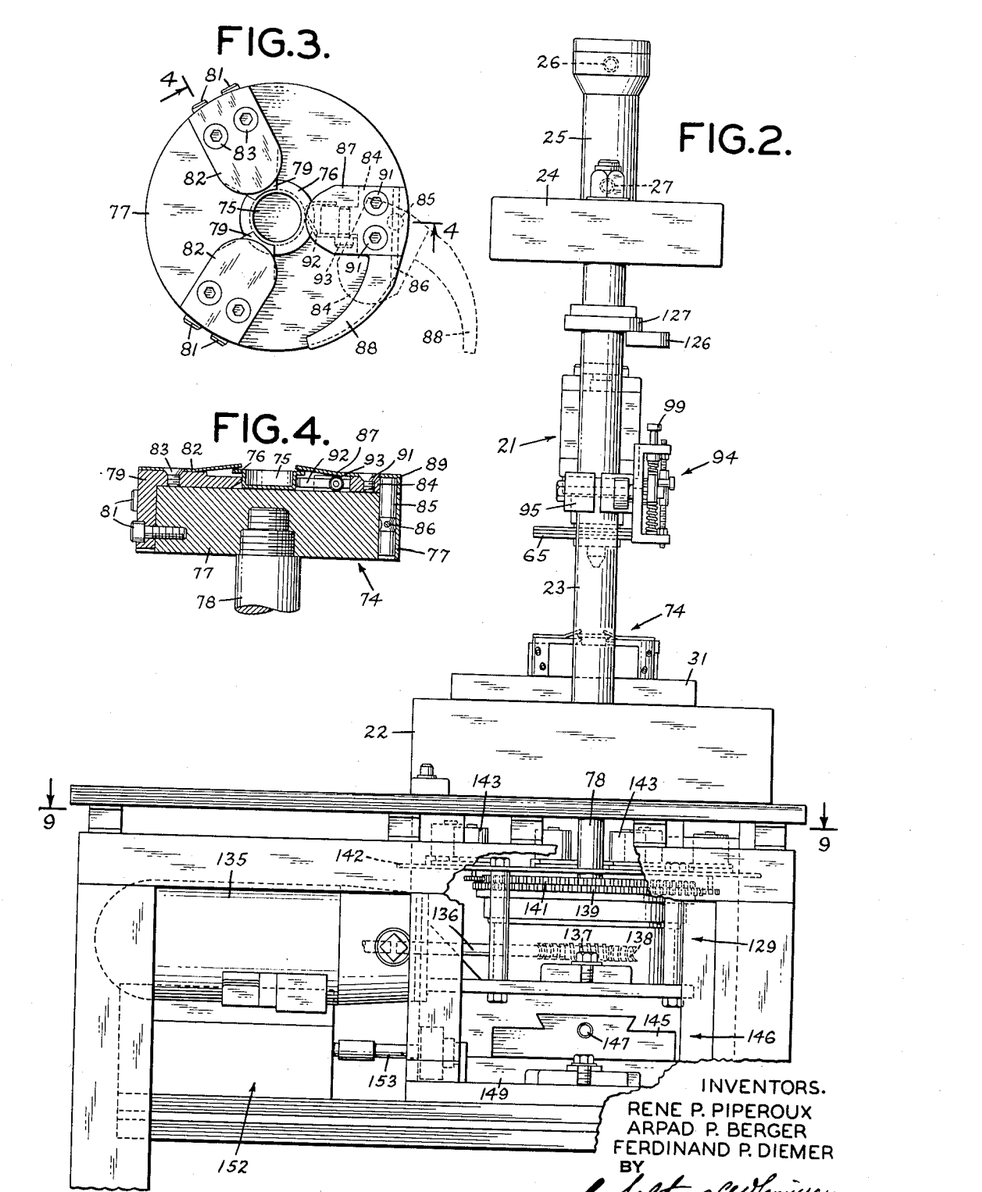
Fig. 2 is a side elevational view of the punch.
Fig. 3 is a top plan view of the anvil, on an enlarged scale, taken on the line 3—3 in Fig. 1 in the direction of the arrows.
Fig. 4 is a cross-sectional view of the anvil taken on the line 4—4 in Fig. 3 in the direction of the arrows.

Referring now to the drawings and more particularly to Figs. 1 and 2 thereof, the reference numeral 21 designates generally a hydraulic press, of a type well known in the art, which comprises a bed 22 and a pair of standards 23 supporting a cross-piece 24 on which is mounted a hydraulic cylinder 25 to which a fluid under pressure is supplied from any suitable source (not shown) through conduits 26 and 27 to operate a plunger 28. The hydraulic press 21 is designed so that the plunger 28 will have a continuous reciprocating motion during the operation thereof.

Ram assembly

Figure 5:
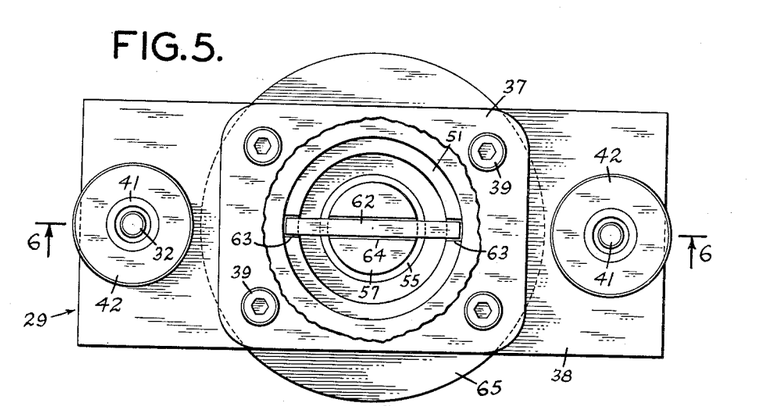
Fig. 5 is a plan view of the ram assembly taken on the line 5—5 in Fig. 1 in the direction of the arrows, with certain parts broken away.
Figure 6:
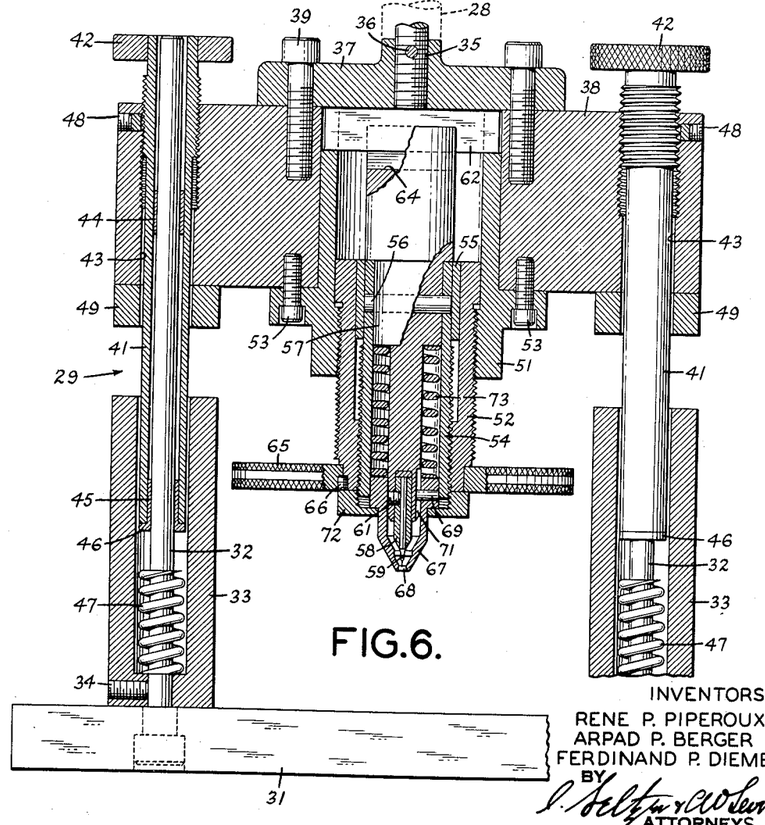
Fig. 6 is a cross-sectional view of the ram assembly taken on the line 6—6 in Fig. 5 in the direction of the arrows.

Positioned beneath the plunger 28 is a ram assembly, indicated generally by reference numeral 29, which is shown in detail in Figs. 5 and 6 of the drawings and which is mounted on a supporting plate 31 resting on the bed 22. Extending through and projecting upwardly from the supporting plate 31 are a pair of stationary guide rods 32. A pair of tubular sleeves 33 are positioned on the guide rods 32, with their lower ends abutting the supporting plate 31, and are secured to said guide rods by means of set screw 34. Fastened to the plunger 28, by means of a stud 35 and a pin 36, is a flange 37 to which a rectangular ram block 38 is secured by means of bolts 39. Tubular members 41, equipped with knurled adjusting knobs 42, extend through the ram block 38 in threaded engagement with apertures 43 therein, and are slidably mounted by means of bushings 44 and 45 on the stationary guide rods 32. The bushings 45 are provided with flanges 46 adapted to come into engagement with springs 47 positioned on the guide rods 32 within the tubular sleeves 33. The tubular members 41 may be locked securely in place by means of set screws 48. Fastened to the underside of the ram block 38 are spacers 49 positioned to strike the tubular sleeves 33 thereby to limit the downward movement of the ram block 38.

Means are provided for holding the punching element on the ram block 38, said means comprising a tubular liner 51 carrying a sleeve 52 in threaded engagement therewith, which liner is fastened to the ram block 38 by means of bolts 53. The sleeve 52 has in threaded engagement therewith a tubular member 54 which bears against a bushing 55 positioned internally of the sleeve 52 and is fastened by means of a pin 56 to a punch holder 57 which carries at its lower end a sleeve 58 within which a punch point 59 is held securely in place by a set screw 61. A key 62, whose ends are engaged in slots 63 provided in the upper end of the sleeve 51 and which extends through a slot 64 lying transversely of the punch holder 57, holds said punch holder against rotation while permitting vertical motion thereof. The threads engaging the tubular liner 51 to the sleeve 52 differ slightly in pitch from and are of the same hand as the threads engaging the sleeve 52, to the tubular member 54. As a result, when dial 65, fastened to the sleeve 52 by means of set screw 66, is rotated, the sleeve 52 will move in one direction relative to the tubular liner 51, carrying with it the tubular member 54, and the punch holder 57, whereas the tubular member 54 will move in the opposite direction relative to the sleeve 52 carrying with it the punch holder 57. The punch holder 57 and the punch point 59 will have a net vertical movement as a result of the difference in pitch between said threads. This construction permits very fine adjustments to be made in the vertical position of the punch holder 57 and the punch point 59. A hold down 67, having an opening 68 in the lower tip thereof, is slidably secured to the punch holder 57 by means of a pin 69 extending into a groove 71 in said punch holder. A nut 72 in threaded engagement with the tubular member 54 secures the hold down 67 in position. The hold down 67 is pressed downwardly by means of a spring 73 to enclose the punch point 59 when the latter is in raised position.

*Anvil*

An anvil, indicated generally by reference number 74, and adapted to engage and support a jet-cup 75 having a flange 76 extending around the periphery thereof, is positioned below the punch point 59 and is shown in detail in Figs. 3 and 4 of the drawings. The anvil 74 comprises an anvil block 77 fastened to the upper end of a shaft 78, which serves to position the anvil 74 as will be set forth more fully hereinafter, and has mounted thereon a pair of chuck jaws 79 each of which is fixedly secured to the anvil block 77 by means of bolts 81 and each of which has spring clamps 82 fastened thereto by means of screws 83. Also mounted on the anvil block 77 is a chuck jaw 84 which is pivotally mounted on the upper end of a pin 85 extending through anvil block 77 and held in place by means of a pin 86. A spring clamp 87, one end of which is shaped to form a handle 88 having a downwardly projecting lip 89 adapted to abut the anvil block 77 (Fig. 1), is fastened to the chuck jaw 84 by means of screws 91. The chuck jaw 84 also carries a leaf-spring 92 which is fastened thereto by means of a bolt 93. To mount the jet-cup 75 on the anvil 74, the chuck jaw 84 is moved, by means of the handle 88, to the position shown in dotted lines in Fig. 3 of the drawings. The jet-cup 75 is abutted against the chuck jaws 79, with the flange 76 underneath the upturned ends of the spring clamps 82 which act to press the jet-cup 75 firmly against the anvil block 77. The chuck jaw 84 is then moved, by means of the handle 88, to the position shown in full lines in Figure 3 of the drawings, with the lip 89 abutting the anvil block 77 and with the leaf spring 92 urging the jet-cup 75 firmly into contact with the chuck jaws 79 to position said jet-cup accurately, and with the up-turned end of the spring clamp 87 overlying the flange 76 to press the jet-cup 75 firmly against the anvil block 77.

As the ram block 38 is moved downwardly by the downstroke of the plunger 28 the hold down 67 will be brought into contact with the jet-cup 75 to assist in holding the same against movement. The further downward movement of the ram block 38 will force the hold down upwardly against the action of the spring 73 and bring the punch point 59 through the opening 68 and into contact with the jet-cup 75. Simultaneously, the tubular members 41 will come into contact with and compress the springs 47 thereby to exert an upward force opposing the downward movement of the ram block 38, which upward force will depend upon the degree of compression of the springs 47 and may be readily controlled by raising or lowering the tubular members 41. The net force on the punch point 59 will equal the difference between the downward force exerted by the plunger 28 and the upward force exerted by the springs 47. The spacers 49 limit the maximum downward movement of the ram block 38 to control the maximum penetration of the punch point 59 into the material of the jet-cup 75 as measured from the base of said jet-cup. As a result, variations in the thickness of the metal in the jet-cup will not produce any variations in the length of the apertures that are drilled through said jet-cup.

*Indexing switch assembly*

Figure 7:
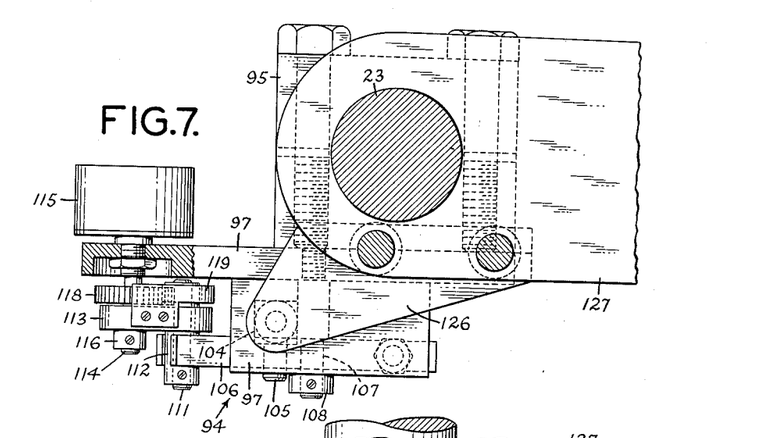
Fig. 7 is a top plan view of the indexing switch assembly taken on the line 7—7 in Fig. 1 in the direction of the arrows.
Figure 8:
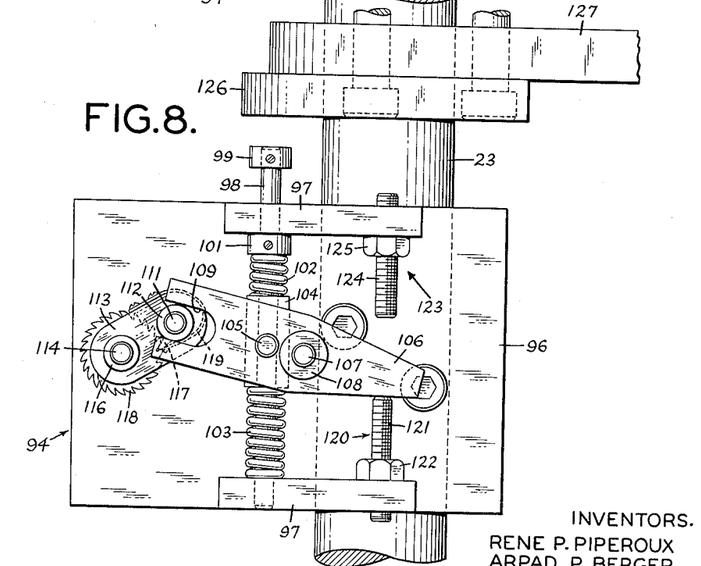
Fig. 8 is a front elevational view of the indexing switch assembly.

An indexing switch assembly, indicated generally by reference numeral 94 and shown in detail in Figs. 7 and 8 of the drawings, is fastened to one of the standards 23 by means of a clamp 95. The indexing switch assembly 94 is mounted on a base plate 96 to which are fastened a pair of brackets 97. A push rod 98 carrying collars 99 and 101 is slidably mounted in the brackets 97 and has mounted thereon springs 102 and 103, and, between said springs, a slider 104. A pin 105 is fixed to said slider 104 and extends through a switch lever 106 pivotally supported on a stud 107 and held in place by means of a collar 108. One end of the switch lever 106 is bifurcated, as shown at 109, and a pin 111 having a sleeve 112 mounted thereon is engaged within the bifurcation. The pin 111 extends through a bracket 113 which is rotatably supported on an operating shaft 114 of an index switch 115 and is held in place by means of a collar 116. Journalled on the pin 111 is a pawl 117 which is urged into engagement with a ratchet 118 by means of a leaf spring 119 that is secured to the bracket 113. At the other end of the switch lever 106, there are provided a lower adjustable stop, indicated generally by reference numeral 120, and comprising a screw 121 in threaded engagement with the lower bracket 97 and a lock nut 122; and an upper adjustable stop, indicated generally by reference numeral 123, and comprising a screw 124 in threaded engagement with the upper bracket 97 and a lock nut 125.

The spring 103 is stronger than the spring 102 and will normally hold the slider 104 in its topmost position as shown in Fig. 8, with the switch lever 106 rotated in a clockwise direction around the stud 107 and in abutment with the lower stop 120. The index switch 115 is operated by means of a striker 126 which is fastened to the underside of a cross-arm 127 carried by the plunger 28 and slidably mounted on the standards 23. On the downstroke of the plunger 28, the striker 126 will force the push rod 98 downwardly, compressing the spring 102 and moving the slider 104 downwardly, thereby to rotate the switch lever 106 in a counterclockwise direction about the stud 107 until it strikes the upper stop 123. The rotation of the switch lever 106 will move the pin 111 downwardly and rotate the bracket 113 in a clockwise direction about the shaft 114 to cause the pawl 117 to drive the ratchet wheel 118, which is fastened to the index switch operating shaft 114, in a clockwise direction thereby to operate the index switch 115. On the upstroke of the plunger 28, the striker 126 releases the push rod 98, permitting the spring 103 to move the slider 104 to its topmost position, thereby to rotate the switch arm 106 in a clockwise direction until it strikes the stop 120 to drive the bracket 113 in a counterclockwise direction and move the pawl 117 into engagement with the ratchet 118 at a new position so that it will again be ready to operate the index switch 115.

Positioning mechanism

Figure 9:
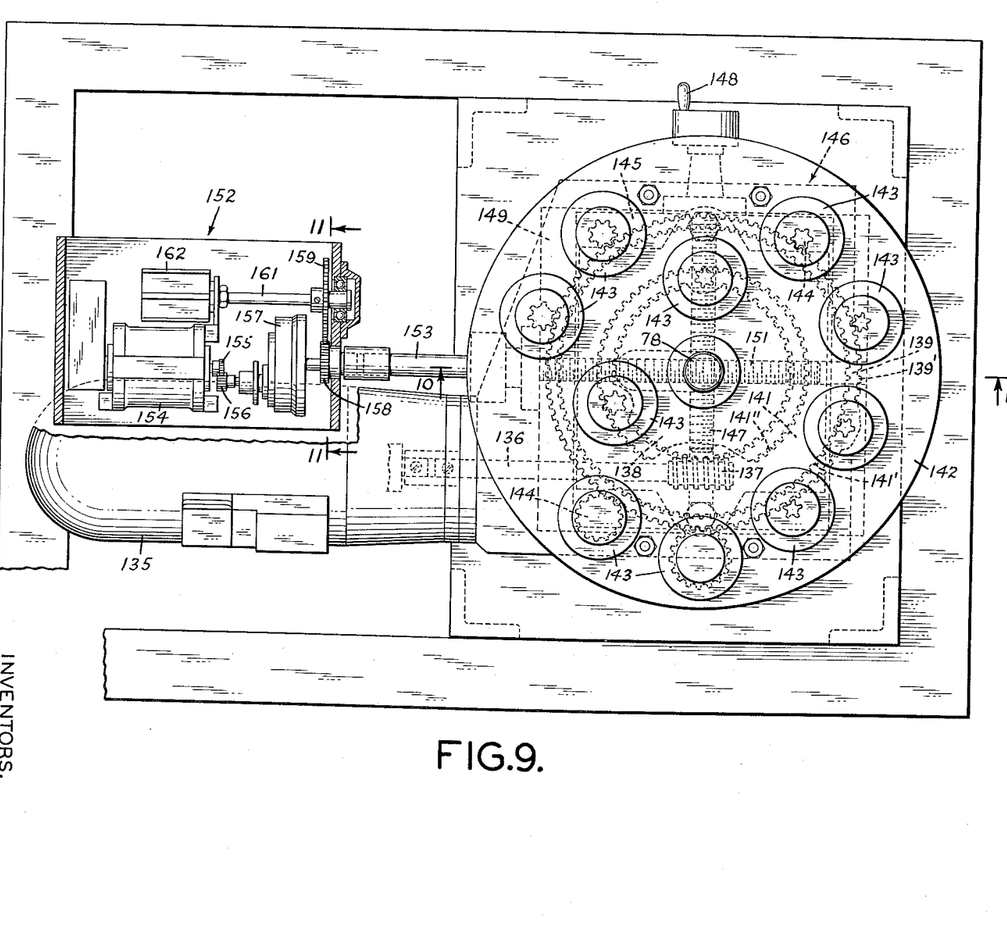
Fig. 9 is a plan view of the index table and the index table drives taken on the line 9—9 in Fig. 2 in the direction of the arrows.
Figure 10:
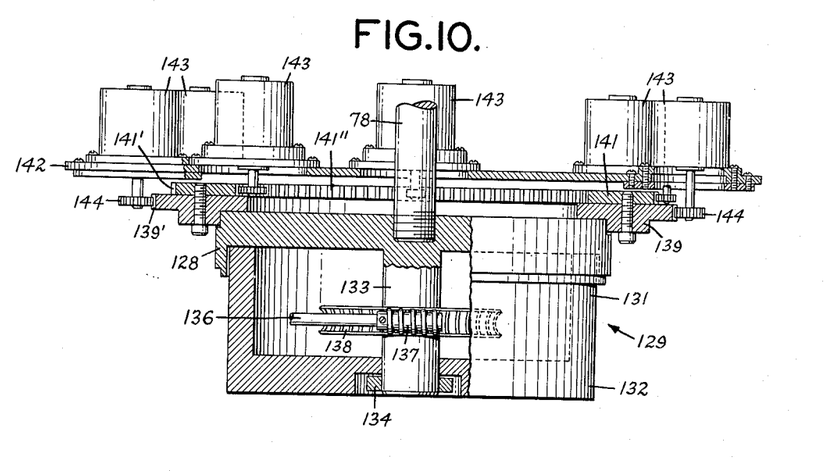
Fig. 10 is a cross-sectional view of the index table taken on the line 10—10 in Fig. 9 in the direction of the arrows.
Figure 11:
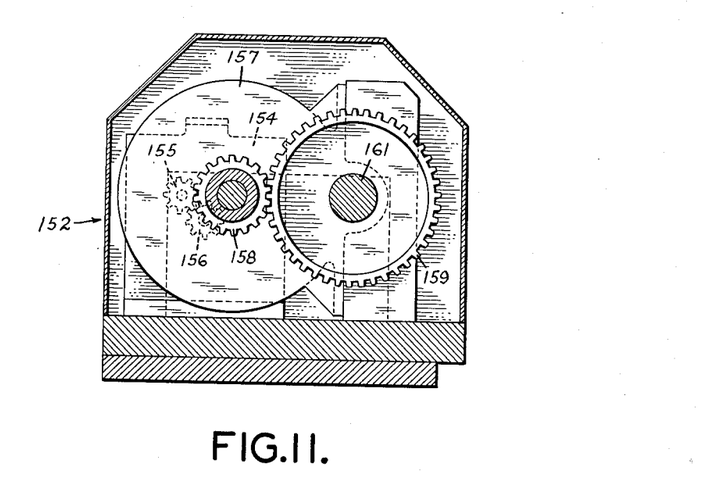
Fig. 11 is a cross-sectional view of the index table radial drive taken on the line 11—11 in Fig. 9 in the direction of the arrows.

The lower end of the shaft 78, to which the anvil 74 is fastened, is secured to platform 128 of a turntable, indicated generally by reference numeral 129 and shown in Figs. 9 and 10 of the drawings. The platform 128 is mounted for rotation on the upper surface of rim 131 of casing 132 and has an elongated boss 133 projecting downwardly therefrom through the base of the casing 132 properly to center the platform 128. A collar 134 fastened to the lower end of the boss 133 prevents the platform 128 from rising vertically off the rim 131.

To rotate the platform 128, there is provided an angular indexing motor 135 which drives a shaft 136 to which is fastened a worm gear 137 in mesh with a worm wheel 138 mounted on the boss 133. A ring gear 139 having external teeth 139' and a ring gear 141 having both external teeth 141' and internal teeth 141'' are fastened to the platform 128. The gear teeth 139' of the ring gear 139 and the external gear teeth 141' and internal gear teeth 141'' on the ring gear 141 all have a different pitch diameter. Mounted above the turntable 129, on a supporting plate 142, are ten synchros 143a–j driven by gears 144a–j that mesh with the ring gear 139 or 141. The gear ratios between the ring gears 139 and 141 and the synchro driving gears 144a–j are all different so that the rotation of the platform 178 through a given angle will rotate each of the synchros 143a–j through a different angle.

The turntable 129 is mounted on upper slide 145 of a double slide compound table, indicated generally by reference numeral 146. The upper slide 145 may be adjusted to position properly the shaft 78 and the anvil 74 beneath the punch point 59 by means of a feed screw 147 that is manually operated by means of a handle 148. Supporting the upper slide 145 is a lower slide 149 which may be moved in a direction at right angles to the motion of the upper slide 145 by means of a feed screw 151 which is driven from a radial index drive, indicated generally by reference numeral 152, through a shaft 153. The radial index drive 152 comprises a radial index motor 154 (Fig. 9) which drives the shaft 153 through a gear 155, a gear 156 and a gear reducer 157. Fastened to the output shaft of the gear reducer 157 is a gear 158 which drives a gear 159 mounted on the shaft 161 of a potentiometer 162 to rotate the movable contact of said potentiometer in synchronism with the movement of the lower slide 149.

Control circuit

Figure 12:
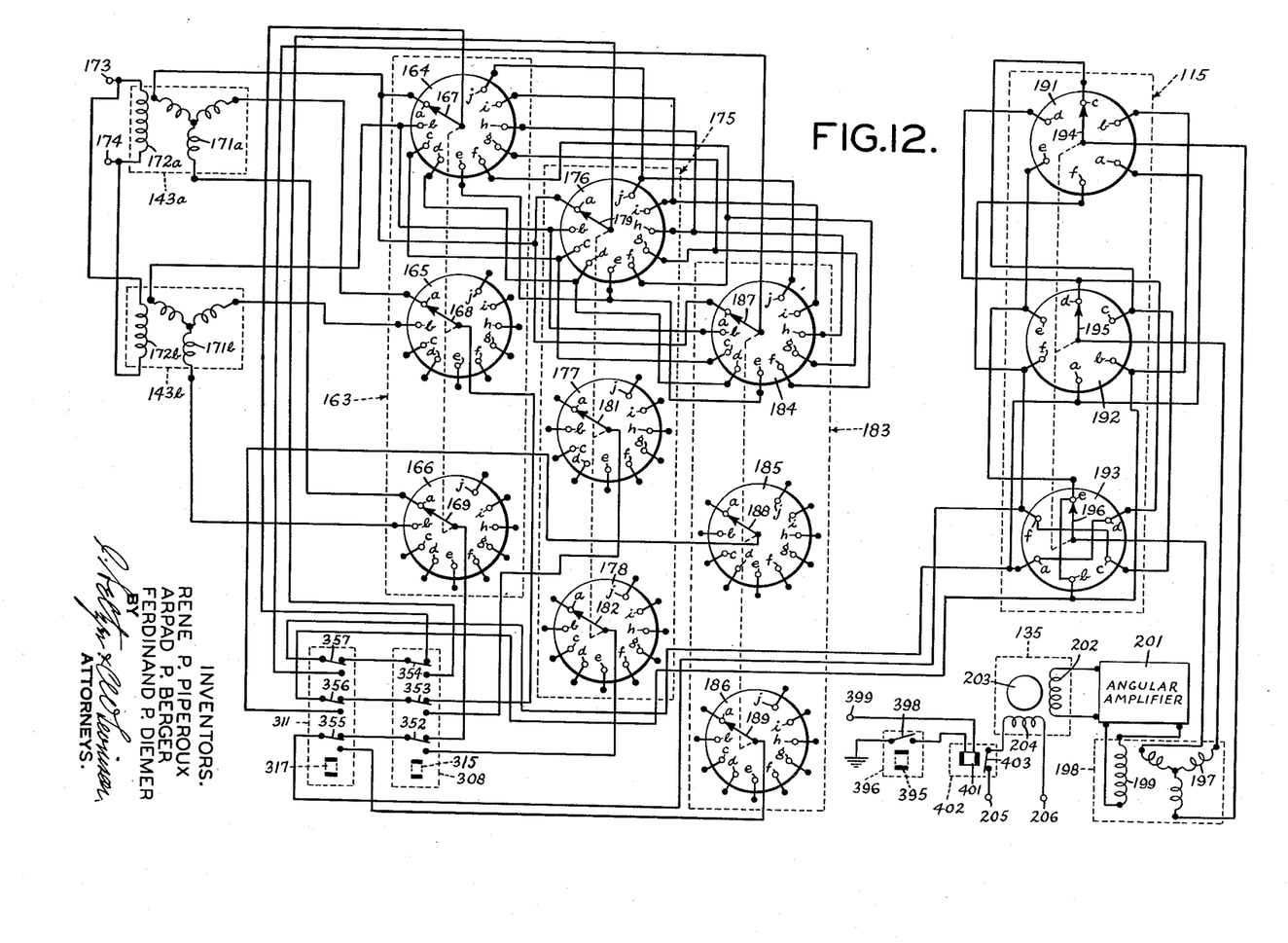
Figs. 12, 13 and 14 are wiring diagrams of the punch control circuit.
Figure 13:
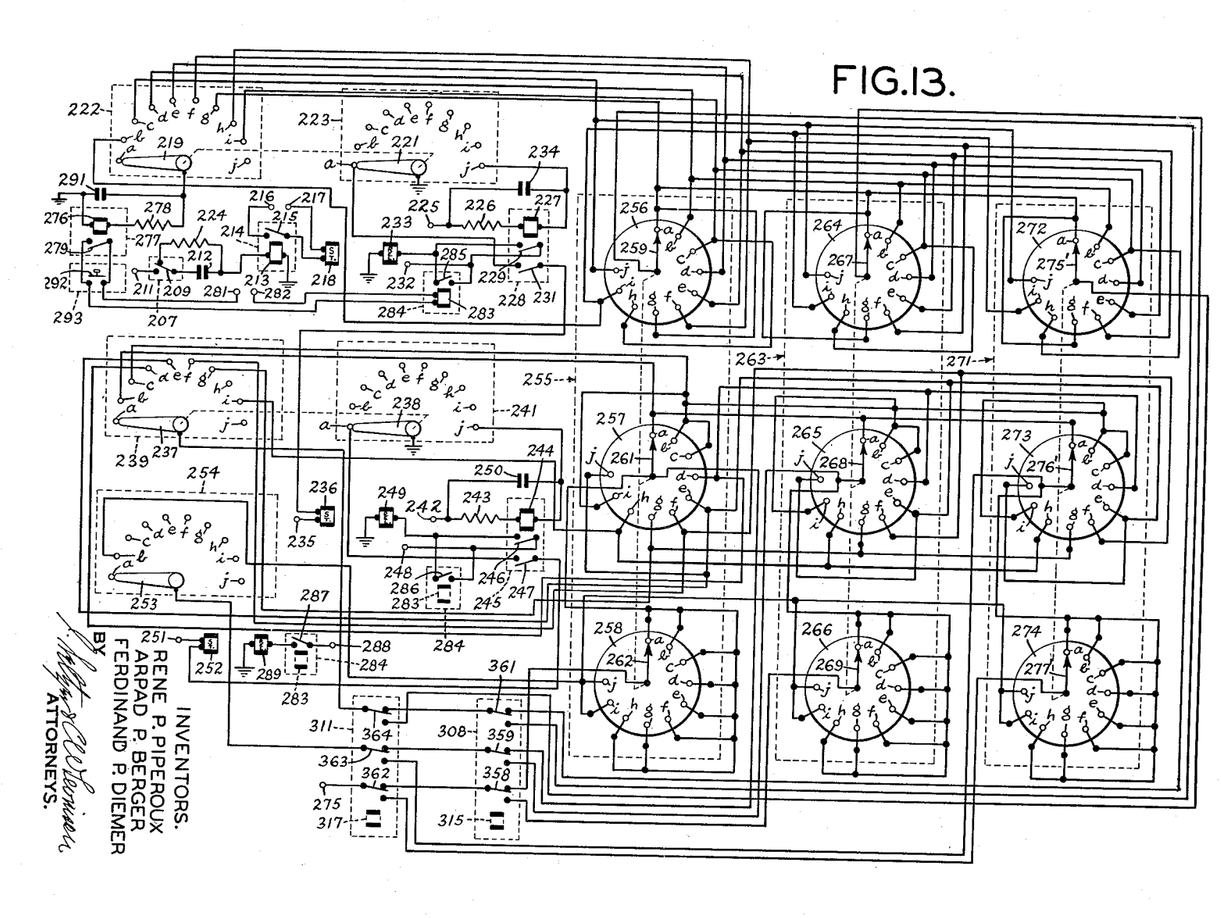
Figure 14:
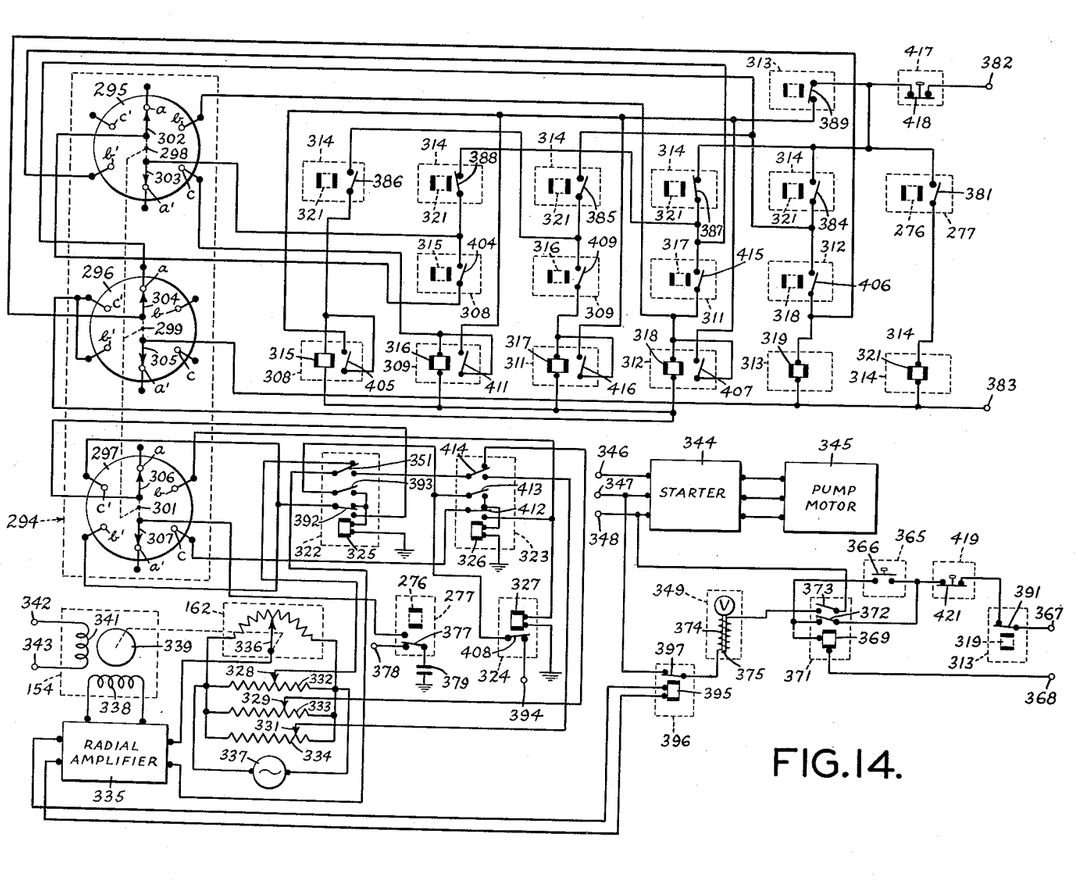

Referring now to Figs. 12 to 14 of the drawings, there is shown the wiring diagram of a control circuit for the punch which may be set to punch up to three concentric circles in the jet cup 75, each of which circles may contain any one of ten different numbers of punches therein.

Angular indexing circuit

The angular spacing between the punches is determined by an angular indexing circuit shown in Fig. 12 of the drawings. The angular indexing circuit includes a first circle angle selector switch, indicated generally by reference numeral 163, comprising wafers 164, 165 and 166, each of which has mounted thereon ten contacts a–j, and ganged wipers 167, 168 and 169. Connected to the contacts 164a, 165a and 166a are the leads from armature 171a of synchro 143a, and connected to the contacts 164b, 165b and 166b are the leads from armature 171b of synchro 143b. The leads from the armatures 171c–j of synchros 143c–j are connected to contacts 164c–j, 165c–j and 166c–j in similar manner and have been omitted from the drawings in the interest of clarity. The fields 171a–j of the synchros 143a–j are connected in parallel and an alternating current is caused to flow therethrough by the application of a suitable voltage to power terminals 173 and 174. A second circle angle selector switch, indicated generally by reference numeral 175, comprising wafers 176, 177 and 178, each of which has mounted thereon ten contacts a–j, and ganged wipers 179, 181 and 182; and a third circle angle sector switch, indicated generally by reference numeral 183, comprising wafers 184, 185 and 186, each of which has mounted thereon ten contacts a–j, and ganged wipers 187, 188 and 189, have their contacts connected in parallel with the contacts of the first circle angle selector switch 163. The leads connecting the contacts on the wafers 165, 177 and 185, and the contacts on the wafers 166, 178 and 186 in parallel have been omitted from the drawings in the interest of clarity since they would be arranged in identical manner with the leads connecting the contacts on the wafers 164, 176 and 184.

The groups of wipers 167, 168 and 169, 179, 181, and 182, and 187, 188 and 189, of the angle selector switches 163, 175 and 183, respectively, are connected, one group at a time, through a relay bank which will be described more fully hereinafter, to the index switch 115 which comprises wafers 191, 192 and 193, each of which has mounted thereon six contacts a–f, and ganged wipers 194, 195 and 196. The contacts a–f on the wafers 191, 192 and 193 are connected together in parallel and the diametrically opposed contacts a and d, b and e, and c and f are connected together in pairs, with the lead from the wipers 167, 179 or 187 being connected to the pair a and d, the lead from the wiper 168, 181 or 188 being connected to the pair b and e, and the lead from the wiper 169, 182 or 189 being connected to the pair c and f. The wipers 194, 195 and 196 are positioned with respect to each other so that one of said wipers will rest on a contact from each of said pairs of contacts and said wipers are connected to armature 197 of reference selsyn 198. The armature 197 is fixedly positioned with respect to field 199 connected to the input of angular amplifier 201, which will amplify any signal it receives from the field 199 in a manner well known in the art. The armature 171 of any of the synchros 143 may be connected to the armature 197 of the reference synchro 198 by rotating the wipers of the angle selector switch until it rests on the appropriate contacts.

When the platform 128 of the turntable 129 is positioned so that the armature 171 of the synchro 143 which is connected to the reference synchro 198 is aligned with the armature 197 of said reference synchro, there will be no voltage induced in the field 199 and no input signal to the angular amplifier 201. Then, when the downstroke of the plunger 23 brings the punch point 59 into contact with the jet cup 75 to punch the same and the striker 126 operates the index switch 115 to shift the wipers 194, 195 and 196 to their next adjoining contacts, it will interchange the connections between the armatures 171 and 197 so that said armatures will, in effect, be 120 degrees out of alignment with respect to each other. This will cause a voltage to be induced in the field 199 which will be amplified by the angular amplifier 201. The output of the angular amplifier 201 is applied to field 202 of angular indexing motor 135, which is a two phase motor having, in addition to field 202, an armature 203 and a second field 204 to which a suitable alternating voltage is applied from power terminals 205 and 206. When the field 202 of the angular indexing motor 135 is energized by the output from the angular amplifier 201, it will cause said motor to rotate, driving the platform 128 and the anvil 74 carrying the jet cup 75 until the armature 171 of the synchro 143 which is connected to the reference synchro 198 has moved through an angle of 120 degrees and is once more in alignment with the armature 197 of said reference synchro. Since the gear ratios between the ring gears 139 and 141 and the synchro driving gears 144a–j are all different, as pointed out above, the degree of rotation of the platform 128 necessary to bring the armatures of the synchros into alignment will depend upon which of the synchros 143a–j is connected to the reference synchro 198 by the setting of the wipers of the angle selector switches. After the platform 128 has come to rest, the downstroke of the plunger 28 will again bring the punch point 59 into contact with the jet cup 75 to punch the same and the striker 126 will again operate the index switch 115 to shift the wipers 194, 195 and 196 to their next adjoining contacts, again interchanging the connections between the armatures 171 and 197 whereupon the platform 128 will be driven further by the angular indexing 135. The angular spacing between the adjoining punches will depend upon the gear ratio between the ring gears 139 and 141 and the synchro 143 which is connected to the reference synchro 198 and will be constant for any setting of the angle selector switches.

*Counter circuit*

The number of punches in each circle is determined by a counter circuit shown in Fig. 13 of the drawings. Each downstroke of the plunger 28 will cause the cross-arm 127 to operate switch 207 which is secured by means of a clamp 208 to one of the standards 23. When switch 207 is operated, contact 209 will be moved to the down position completing the circuit from power terminal 211 through capacitor 212 and coil 213 of relay 214 to ground. Current will flow momentarily through this circuit causing contact 215 to close, completing the circuit from terminals 216 and 217 to stepper coil 218. When stepper coil 218 is energized it will advance ganged wipers 219 and 221 of stepping switches 222 and 223, respectively, each of which has ten contacts a–j, to their next adjoining contacts. The upstroke of the plunger 28 will permit contact 209 to move to the up position discharging the capacitor 212 through resistor 224 and placing the circuit in readiness for the next count.

At the ninth count, the wiper 221, which is connected to ground, will be moved to the contact 223j completing the circuit from terminal 225 through resistor 226 and coil 227 of relay 228 to ground and causing contacts 229 and 231 to close. The closing of contact 229 completes the circuit from power terminal 232 through release coil 233 to ground. When release coil 233 is energized it will permit the wipers 219 and 221 to return to their starting positions on contacts 222a and 223a, respectively. Capacitor 234, connected across the resistor 226 and the coil 227, acts as a time delay to hold the contacts 229 and 231 closed for a short interval of time after the wiper 221 leaves the contact 223j so that on reaching the contact 223a the wiper 221 will complete the circuit from power terminal 235 through stepper coil 236 and contact 231 to ground. When stepper coil 236 is energized it will advance ganged wipers 237 and 238 of stepping switches 239 and 241, respectively, each of which has ten contacts a–j, to their next adjoining contacts. This cycle of operations is repeated on every successive ninth count.

At the eighty-first count, the wiper 238, which is connected to ground, will be moved to contact 241j completing the circuit from power terminal 242 through resistor 243 and coil 244 of relay 245 to ground and causing contacts 246 and 247 to close. The closing of contact 246 completes the circuit from power terminal 248 through release coil 249 to ground. When release coil 249 is energized, it will permit the wipers 237 and 238 to return to their starting positions on contacts 239a and 241a, respectively. Capacitor 250, connected across the resistor 243 and the coil 244, acts as a time delay to hold the contacts 246 and 247 closed for a short interval of time after the wiper 238 leaves the contact 241j so that on reaching the contact 241a the wiper 238 will complete the circuit from power terminal 251 through stepper coil 252 and contact 247 to ground. When stepper coil 252 is energized, it will advance wiper 253 of stepping switch 254, which has ten contacts a–j, to its next adjoining contact.

Connected to the contacts 222a–j, 239a–j and 254a–j of the stepping switches 222, 239 and 254, respectively, is a first circle number selector switch, indicated generally by reference numeral 255, comprising wafers 256, 257 and 258, each of which has mounted thereon ten contacts a–j, and ganged wipers 259, 261 and 262. A second circle number selector switch, indicated generally by reference numeral 263, comprising wafers 264, 265 and 266, each of which has ten contacts a–j mounted thereon, and ganged wipers 267, 268 and 269, and a third circle number selector switch, indicated generally by reference numeral 271, comprising wafers 272, 273 and 274, each of which has ten contacts a–j mounted thereon, and ganged wipers 275', 276' and 277', have the contacts of wafers 264 and 265, and 272 and 273 connected in parallel with the contacts of wafers 256 and 257, respectively, of the first circle number selector switch 255. The groups of wipers 259, 261 and 262, 267, 268 and 269, and 275', 276' and 277', of the number selector switches 255, 263 and 271, respectively, are connected, one group at a time, through a relay bank which will be described more fully hereinafter, to the wiper 237 of the stepping switch 239, to the wiper 253 of the stepping switch 254 and to power terminal 275.

The number selector switches and the stepping switches are interconnected to count a predetermined number of punches in each circle of the jet cup 75. For example, when the wipers of the first circle number selector switch 255 are set on contacts a of said switch and the switch 207 has been operated fifteen times by the downstroke of the plunger 28, the wiper 237 of the stepping switch 239 will have been moved to the contact 239b representing a count of nine, and the wiper 219 of the stepping switch 222 will have been moved to the contact 222g representing a count of six, or a total count of fifteen. With the wipers 219 and 237 in this position, there will be a complete circuit from power terminal 275 through wiper 262, contact 258a, wiper 261, contact 257a, contact 239b, wiper 237, wiper 259, contact 256a, contact 222g and wiper 219 through resistor 278 to coil 276 of relay 277, and from said coil 276 to ground. Similarly, when the wipers of the first circle number selector switch 255 are set on contacts j of said switch and the switch 207 has been operated on hundred and twenty times by the downstrokes of the plunger 28, the wiper 253 of the stepping switch 254 will have been moved to the contact 254b representing a count of eighty-one, the wiper 237 of the stepping switch 239 will have been moved to the contact 239e representing a count of thirty-six, and the wiper 219 of the stepping switch 222 will have been moved to the contact 222d representing a count of three, or a total count of one hundred and twenty. With the wipers 219, 237 and 253 in this position, there will be a complete circuit from power terminal 275 through wiper 262, contact 258j, contact 254b, wiper 253, wiper 261, contact 257j, contact 239e, wiper 237, wiper 259, contact 256j, contact 222d, and wiper 219 to resistor 278 and from said resistor 278 through coil 276 of relay 277 to ground. For each position of the number selector switches, the following count will be made with the interconnections shown in the accompanying drawings,

| Number of Selector Switch Setting | Punch Count | Wiper 219 Position | Wiper 237 Position | Wiper 253 Position |
|---|---|---|---|---|
| Contact | | Contact | Contact | Contact |
| a | 15 | g | b | a |
| b | 20 | c | c | a |
| c | 26 | i | c | a |
| d | 32 | f | d | a |
| e | 40 | e | e | a |
| f | 52 | h | f | a |
| g | 60 | g | g | a |
| h | 80 | i | i | a |
| i | 100 | h | c | b |
| j | 120 | d | e | b |

When the coil 276 is energized, it will cause contact 279 to close completing the circuit from power terminals 281 and 282 through coil 283 of relay 284 thereby causing contacts 285, 286 and 287 to close. The contact 285 is connected in parallel with the contact 229 and will, when closed, complete the circuit through release coil 233 permitting the wipers 219 and 221 to return to their starting position on contacts 222a and 223a, respectively. The contact 286 is connected in parallel with the contact 246 and will, when closed, complete the circuit through release coil 249 permitting the wipers 237 and 238 to return to their starting position on contacts 239a and 241a, respectively. The contact 287 will, when closed, complete the circuit from power terminal 288 through release coil 289 permitting wiper 253 to return to its starting position on contact 254a. A capacitor 291, connected across the coil 276 and the resistor 278, acts as a time delay to hold the relay 277 energized for a short interval after the wipers of the stepping switches have returned to their starting positions. Connected in parallel with the contact 279 is contact 292 of a manually operated switch 293, which, when operated, will restore the stepping switches of the counter circuit to their starting position.

Circle selector circuit

The number of concentric circles that will be punched in the jet-cup 75 is determined by the circle selector circuit shown in Fig. 14 of the accompanying drawings. The circle selector circuit includes a circle selector switch, indicated generally by reference numeral 294, comprising three wafers 295, 296 and 297, each of which has two sets of three contacts a, b and c, and a', b' and c' mounted thereon. Associated with the wafers 295, 296 and 297, respectively, are ganged wiper arms 298, 299 and 301 each of which has fastened thereto, respectively, a pair of wipers 302 and 303, 304 and 305, and 306 and 307 insulated one from the other. The contacts on the wafers 295 and 296 and the wipers 302, 303, 304 and 305 are connected to a sequential relay bank, comprising six relays 308, 309, 311, 312 and 313 and 314, having coils 315, 316, 317, 318, 319 and 321, respectively. The contacts on the wafer 297 and the wipers 306 and 307 are connected to a relay bank comprising three relays 322, 323 and 324 having coils 325, 326 and 327, respectively.

The relays 322, 323 and 324, as will be set forth more fully hereinafter, serve to connect one of movable contacts 328, 329 and 331 of first row potentiometer 332, second row potentiometer 333 and third row potentiometer 334, respectively, to the input of radial amplifier 335. Also connected to the input of radial amplifier 335 is movable contact 336 of potentiometer 162. The potentiometer 162 is connected in parallel with the potentiometers 332, 333 and 334 to form a Wheatstone bridge to which a suitable alternating voltage is applied from a power source 337. The output of the radial amplifier 335 is applied to field 338 of radial index motor 154, which is a two-phase motor having, in addition to field 338, an armature 339 and a second field 341 to which a suitable alternating voltage is applied from power terminals 342 and 343. When the field 338 of the radial indexing motor 154 is energized by the output from the radial amplifier 335 it will cause said motor to rotate, moving the lower slide 149 properly to position the jet-cup 75 beneath the punch point 59. The movable contact 336 of the potentiometer 162, which is geared to the output of the radial index motor 154, will rotate in synchronism with the movement of the lower slide 149. When the movable contact 336 has moved to a position where the Wheatstone bridge is balanced, there will be no input to the radial amplifier 335 and no output from said amplifier so that the radial index motor 154 will cease to rotate.

When operation of the punch is to begin, a jet cup 75 is mounted on the anvil 74 and starter 344 is operated to connect pump motor 345 to power terminals 346, 347 and 348 in a manner well known in the art to build up pressure in the hydraulic system of the hydraulic press 21. However, solenoid operated valve 349 positioned in the conduit 26 will prevent the flow of fluid to the hydraulic cylinder 25 thereby preventing the operation of the plunger 28. At this time, the movable contact 328 of the first row potentiometer 332 will be connected to the input of radial amplifier 335 through contact 351 of relay 322. Under these conditions, the radial motor 154 will rotate until it has balanced the Wheatstone bridge made up of the potentiometer 162 and the first row potentiometer 332 bringing the lower slide 149 and the jet-cup 75 to a position determined by the setting of the movable contact 328. At the same time, there will be no current flowing through the coils 315 and 317 of the relays 308 and 311, respectively, so that the contacts 352, 353 and 354 of the relay 308, and contacts 355, 356 and 357 of the relay 311 (Fig. 12) will all be in the up position connecting the wipers of the first circle angle selector switch 163 to the armature 197 of the reference synchro 198 through the index switch 115. Similarly, contacts 358, 359 and 361 of the relay 308 and contacts 362, 363 and 364 of the relay 311 (Fig. 13), will all be in the up position connecting the wipers of the first circle number selector switch 255 to the stepping switches 222, 239 and 254.

Switch 365 is then operated manually to close contact 366 completing the circuit from power terminals 367 and 368 through coil 369 of relay 371. When the coil 369 is energized, it will cause holding contact 372, which is connected in parallel with the contact 366, to close so that current will continue to flow through said coil after the switch 365 is released, and will also cause contact 373 to close, completing the circuit from power terminals 347 and 348 through coil 374 of solenoid operated valve 349 and moving plunger 375 to open said valve. Fluid under pressure will then flow to the hydraulic cylinder 25 to operate the plunger 28. Each downstroke of the plunger 28 will operate the index switch 115 causing the angular index motor 135 to rotate the jet-cup 75 through an angle determined by the setting of the first circle angle selector switch 163 as pointed out above. Each downstroke of the plunger 28 will also operate the switch 207 to energize the counting circuit as pointed out above. When a number of punches equivalent to the setting of the first circle number selector switch 255 has been made, the relay 277 will be energized returning the counting circuit to its original condition. If, as is usually the case, it is desired to space the punches uniformly about the circumference of a circle, the first circle angle selector switch 163 and the first circle number selector switch 255 should be set so that the product of the angular spacing between adjoining punches multiplied by the number of punches is equal to three hundred and sixty degrees.

When it is desired to punch only a single circle in the jet-cup 75, the circle selector switch 294 is set with its wipers on the contacts a and a' as shown in Fig. 14 of the attached drawings. Then, when the relay 277 is energized after the desired number of punches have been made in the jet cup 75, it will cause contact 377 to move to the up position. In the down position, contact 377 connects power terminal 378 to one side of capacitor 379 to charge the same, the other side of said capacitor being connected to ground. When it moves to the up position, the contact 377 connects the charged capacitor 379 to wiper 307. However, since the wiper 307 rests on contact 297a' which is blank, the movement of the contact 377 will have no effect. The relay 277, when energized, will also cause contact 381 to close, completing the circuit from power terminals 382 and 383 through coil 321 of relay 314. The flow of current through the coil 321 will cause contacts 384, 385 and 386 to close and contacts 387 and 388 to open. Closing of contact 384 will complete the circuit from power terminal 382, through contact 296a and wiper 304, to coil 319 of relay 313, and from said coil 319 to power terminal 383. The flow of current through coil 319 will cause contact 389 to open, which will have no effect when the circle selector switch is set to punch only one circle, and will also cause contact 391 to open breaking the circuit from power terminals 367 and 368 through the coil 369 of relay 371. This will cause the holding contact 372 and the contact 373 to open, stopping the flow of current through the coil 374 and permitting the solenoid operated valve 349 to close thereby interrupting the operation of the plunger 28. The punched jet-cup 75 is then replaced by another jet-cup and the entire cycle repeated by operating the switch 365.

When, however, it is desired to punch two circles in the jet-cup 75, the circle selector switch 294 is set with its wipers on the contacts b and b'. Then, when the relay 277 is energized after the desired number of punches have been made in the first circle on the jet-cup 75, as determined by the setting of the first circle number selector switch 255, and the contact 377 has been moved to the up position, a pulse of current will flow from the capacitor 379 through the wiper 307, contact 297b' and contact 392 of relay 322 to coil 325 of relay 322, and from said coil 325 to ground. The momentary flow of current from the capacitor 379 through the coil 325 will cause holding contact 393 to close completing the circuit from power terminal 394 through coil 325 to ground so that current will continue to flow through said coil 325 after the capacitor 379 is discharged and the contact 377 has returned to the down position. The flow of current through the coil 325 will also cause the contact 392 to move to the down position, and will cause the contact 351 to move to the down position disconnecting the movable contact 328 of the first circle potentiometer 332 from the input of the radial amplifier 335 and connecting the movable contact 329 of the second circle potentiometer 333 in its place. The Wheatstone bridge, which now includes the potentiometer 162 and the second circle potentiometer 333, will be unbalanced, causing an input signal to be applied to the radial amplifier 335 which will amplify the same. The output from the radial amplifier 335 will cause the radial motor 154 to rotate until it has moved the lower slide 149 so that the jet-cup 75 is positioned properly for punching the second circle, as determined by the setting of the movable contact 329, and the movable contact 336 is in a position where the Wheatstone bridge is balanced once more. The output voltage from the radial amplifier 335 will also be applied to coil 395 of relay 396 causing contact 397 to open and thereby breaking the circuit from power terminals 347 and 348 to coil 374 and permitting the solenoid operated valve 349 to close to prevent operation of the plunger 28 so long as the radial index motor 154 is rotating. The flow of current from the radial amplifier 335 through the coil 395 will also cause the contact 398 (Fig. 12) to close completing the circuit from power terminal 399 through coil 401 of relay 402 causing contact 403 to open breaking the circuit from power terminals 205 and 266 to field 204 of angular index motor 135 to prevent the operation of said angular index motor 135 so long as the radial index motor 154 is rotating. When the radial index motor 154 has moved the jet-cup 75 to the proper position for punching the second circle, as determined by the setting of the movable contact 329, there will be no output from the radial amplifier 335 and no current will flow through the coil 395. Thereupon, the contact 397 will close, causing the solenoid operated valve 349 to open thereby starting the operation of the plunger 28, and the contact 393 will open deenergizing coil 401 and permitting power to flow to the field 204 of angular indexing motor 135 so that punching of the second circle in the jet-cup 75 can proceed.

Concurrently with the upward movement of the contact 377, the energizing of relay 277 after the desired number of punches have been made in the first circle on the jet-cup 75 will cause the contact 381 to close, completing the circuit through coil 321 of relay 314 causing the contacts 384, 385 and 386 to close and the contacts 387 and 388 to open. The closing of contacts 384, 385 and 386 completes the circuit from power terminal 382 through contact 384, contact 385 and contact 386 to coil 315 of relay 308 and from said coil 315 through contact 296b' and wiper 305 to power terminal 383. The flow of current through coil 315 will cause the contacts 352, 353 and 354 (Fig. 12) to move to the down position disconnecting the wipers of the first circle angle selector switch 163 from the armature 197 of the reference synchro 198 and connecting the wipers of the second circle angle selector switch 175 in their place so that the angular spacing between adjoining punches in the second circle in the jet-cup 75 will be determined by the setting of said second circle angle selector switch. The flow of current through the coil 315 will also cause contacts 358, 359 and 361 (Fig. 13) to move to the down position disconnecting the wipers of the first circle number selector switch 255 from the stepping switch 222, 239 and 254 and connecting the wipers of the second circle number selector switch 263 in their place so that the number of punches in the second circle on the jet-cup 75 will be determined by the setting of said second circle number selector switch. Finally, the flow of current through the coil 315 will cause contact 404 to close and will also cause holding contact 405 to close so that current will continue to flow from power terminal 382 through contact 389 and contact 405 to coil 315 and from said coil 315 through contact 296b' and wiper 305 to power terminal 383 after contact 381 has opened and deenergized relay 314 causing contacts 384, 385 and 386 to open and contacts 387 and 388 to close. The closing of contacts 387 and 388 will complete the circuit from power terminal 382 through contact 387, contact 388, contact 404 which is now closed, wiper 302 and contact 295b to coil 318 of relay 312 and from said coil 318 through contact 296b' and wiper 305, to power terminal 383. The flow of current through coil 318 will cause contact 406 to close and will also cause holding contact 407 to close so that current will continue to flow from power terminal 382 through contact 389 and contact 407 to said coil 318, and from said coil 318 through contact 296b' and wiper 305 to power terminal 383 when contacts 387 and 388 are again opened.

When the relay 277 is again energized after the desired number of punches have been made in the second circle in the jet-cup 75, as determined by the setting of the second circle number selector switch 263, and the contact 377 has been moved to the up position, a pulse of current will flow from the capacitor 379 through the wiper 307, the contact 297b', contact 392 which is now in the down position, wiper 306 and contact 297b to coil 327 of relay 324 and from said coil 327 to ground, causing contact 408 to open thereby breaking the circuit from power terminal 394 through holding contact 393 to coil 325 of relay 322 and from said coil 325 to ground. The deenergizing of relay 322 will cause the contacts 351, 392 and 393 to return to the position shown in Fig. 14 of of the drawings, disconnecting the movable contact 329 from the input of the radial amplifier 335 and connecting the movable contact 328 in its place. The Wheatstone bridge, which includes once more the potentiometer 162 and the first circle potentiometer 332, will be unbalanced causing an input signal to be applied to the radial amplifier 335 which will amplify the same. The output from the radial amplifier 335 will cause the radial index motor 154 to rotate until it has moved the lower slide 149 so that the jet-cup 75 is positioned properly for punching the first circle once more and the movable contact 336 is in a position where the Wheatstone bridge is balanced once more. The output voltage from the radial amplifier 335 will also prevent operation of the plunger 28 by causing the solenoid operated valve 349 to close as pointed out above.

Concurrently with the second upward movement of the contact 377, the energizing of relay 277, after the desired number of punches have been made in the second circle on the jet-cup 75, will cause the contact 381 to close, completing the circuit through coil 321 of relay 314 and causing the contacts 384, 385 and 386 to close and the contacts 387 and 388 to open. The closing of contact 384 will complete the circuit from power terminal 382 through coil 319 of relay 313 to power terminal 383 causing contact 389 to open. Current will, however, continue to flow from power terminal 383 to coil 315 of relay 308 through contact 384, contact 385 and contact 386 which are all closed. Current will also continue to flow from power terminal 382 to coil 318 of relay 312 through contact 384, contact 385, contact 386 and contact 405 which are all closed. The energizing of relay 313 will also stop operation of plunger 28 as pointed out above. When the relay 277 is deenergized, the contact 381 will open, deenergizing the relay 314 and causing the contacts 384, 385 and 386 to open and contacts 387 and 388 to close. The opening of contacts 384, 385 and 386 will interrupt the flow of current through the coils of relay 308, 312 and 313, causing the contacts 404 and 406 and the holding contacts 405 and 407 to open and causing the contacts 389 and 391 to close thereby returning the sequential relay bank to its original condition in readiness for another cycle. The punched jet-cup 75 is then replaced by another jet-cup and the entire cycle repeated by operating the switch 365.

When it is desired to punch three circles in the jet-cup 75, the circle selector switch 294 is set with its wipers on the contacts c and c'. Then, when the relay 277 is energized after the desired number of punches have been made in the first circle on the jet-cup 75 as determined by the setting of the first circle number selector switch 255 and the contact 277 has been moved to up position, a pulse of current flow from the capacitor 379 through the wiper 307, contact 297c' and contact 392 of relay 322 to coil 325 of relay 322 and from said coil 325 to ground. The momentary flow of current from the capacitor 379 through the coil 325 will, as pointed out above, close the holding contact 393 so that current will flow through said coil 325 from power terminal 394. The flow of current through the coil 325 will also disconnect the movable contact 328 of the first circle potentiometer 332 from the input of the radial amplifier 335 and connect the movable contact 329 of the second circle potentiometer 333 in its place; whereupon the operation of the plunger 28 and the angular index motor 135 will be stopped temporarily and the radial index motor 154 will rotate until it has moved the jet-cup 75 to the proper position for punching the second circle as determined by the setting of the movable contact 329.

Concurrently with the upward movement of the contact 377, the energizing of relay 277 after the desired number of punches have been made in the first circle on the jet-cup 75 will cause the contact 381 to close, energizing the relay 314 and causing the contacts 384, 385 and 386 to close and the contacts 387 and 388 to open. The closing of contacts 384, 385 and 386 will complete the circuit from power terminal 382 to coil 315 of relay 308 and from the said coil 315 through contact 296c' and wiper 305 to power terminal 383. The flow of current through the coil 315 will, as pointed out above, disconnect the wipers of the first circle angle selector switch 163 from the armature of the reference synchro 198 and connect the wipers of the second circle angle selector switch 175 in their place; and will also disconnect the wipers of the first circle number selector switch 255 from the stepping switches 222, 239 and 254 and connect the wipers of the second circle number selector switch 263 in their place. Finally, the flow of current through the coil 315 will cause the contact 404 and the holding contact 405 to close. When the relay 277 is deenergized it will cause the contact 381 to open deenergizing the relay 314 and causing contacts 384, 385 and 386 to open and contacts 387 and 388 to close. The closing of contacts 387 and 388 will complete the circuit from power terminal 382, through contact 387, contact 388, contact 404 which is now closed, wiper 302 and contact 295c to coil 316 will cause contact 409 to close and will also cause holding contact 411 to close so that current will continue to flow from power terminal 382 through contact 389 and contact 411 to said coil 316, and from said coil 316 through contact 296c' and wiper 305 to power terminal 383 when contacts 387 and 388 are again opened. Punching of the second circle in the jet-cup 75 now proceeds with the angular spacing between adjoining punches determined by the setting of the second circle angle selector switch 175.

When the relay 277 is again energized after the desired number of punches have been made in the second circle in the jet-cup 75, as determined by the setting of the second circle number selector switch 263, and the contact 377 has been moved to the up position, a pulse of current will flow from the capacitor 279 through wiper 307, contact 297c', contact 392 which is in the down position, wiper 306, contact 297c and contact 412 of relay 323 to coil 326 of relay 323 and from said coil 326 to ground. The momentary flow of current from the capacitor 379 through the coil 326 will cause holding contact 413 to close completing the circuit from power terminal 394 through coil 326 to ground so that current will continue to flow through said coil 326 after the capacitor 379 is discharged and the contact 377 has returned to the down position. The flow of current through the coil 326 will also cause the contact 414 to move to the down position disconnecting the movable contact 329 of the second circle potentiometer 333 from the input of the radial amplifier 335 and connecting the movable contact 331 of the third circle potentiometer 334 in its place through the contacts 351 and 414 which are in the down position; whereupon, the operation of the plunger 28 and the angular index motor 135 will be stopped temporarily and the radial index motor 154 will rotate until it has moved the jet-cup 75 to the proper position for punching the third circle as determined by the setting of the movable contact 331.

Concurrently with the upward movement of the contact 377, the energizing of relay 277 after the desired number of punches have been made in the second circle in the jet-cup 75, will cause the contact 381 to close, energizing the relay 314 and causing the contacts 384, 385 and 386 to close and the contacts 387 and 388 to open. The closing of contacts 384 and 385 will complete the circuit from power terminal 382 through contact 384, contact 385 and contact 409 which is now closed to coil 317 of relay 311 and from said coil 317 through contact 296c' and wiper 305 to power terminal 383.

The flow of current through the coil 317 will cause the contacts 355, 356 and 357 (Fig. 12) to move to the down position disconnecting the wipers of the second circle angle selector switch 175 from the armature 197 of the reference synchro 198 and connecting the wipers of the third circle angle selector switch 183 in their place so that the angular spacing between adjoining punches in the third circle on the jet-cup 75 will be determined by the setting of said third circle angle selector switch. The flow of current through the coil 317 will also cause the contacts 362, 363 and 364 (Fig. 13) to move to the down position disconnecting the wipers of the second circle number selector 263 from the stepping switches 222, 239 and 254 and connecting the wipers of the third circle number selector switch 271 in their place so that the number of punches in the third circle on the jet-cup 75 will be determined by the setting of said third circle number selector switch. Finally, the flow of current through the coil 317 will cause contact 415 to close and will also cause holding contact 416 to close so that current will continue to flow from power terminal 382 through contact 389 and contact 416 to coil 317 and from said coil 317 through contact 296c' and wiper 305 to power terminal 383, after contact 381 has opened and deenergized relay 314 causing contacts 384, 385 and 386 to open and contacts 387 and 388 to close. The closing of contact 387 will complete the circuit from power terminal 382 through contact 387 and contact 415, which is closed, to coil 318 of relay 312 and from said coil 318 through contact 296c' and wiper 305 to power terminal 383. The flow of current through coil 318 will cause contact 406 to close, and will also cause holding contact 407 to close. Punching of the third circle in the jet-cup 75 proceeds with the angular spacing between between adjoining punches determined by the setting of the third circle angle selector switch 183.

When the relay 277 is again energized after the desired number of punches have been made in the third circle in the jet-cup 75, as determined by the setting of third circle number selector switch 271, and the contact 377 has been moved to the up position, a pulse of current will flow from the capacitor 379 through the wiper 307, contact 297c', contact 392, which is in the down position, wiper 306, contact 297c and contact 412, which is in the down position, to coil 327 of relay 324 and from said coil 327 to ground, causing contact 408 to open thereby breaking the circuit from power terminal 394 to coil 325 through holding contact 393 and to coil 326 through holding contact 413. The deenergizing of relays 322 and 323 causes the contacts 351, 392 and 393 and the contacts 412, 413 and 414 to return to the position shown in Fig. 14 of the drawings, disconnecting the movable contact 331 of the third circle potentiometer 334 from the input of the radial amplifier 335 and connecting the movable contact 328 of the first circle potentiometer 332 in its place; whereupon the operation of the plunger 28 and the angular index motor 135 will be stopped temporarily and the radial index motor 154 will rotate until it has moved the jet-cup 75 to the proper position for again punching the first circle in the jet-cup 75 as determined by the setting of the movable contact 328.

Currently with the third upward movement of the contact 377, the energizing of relay 277 after the desired number of punches have been made in the third circle on the jet-cup 75 will cause the contact 381 to close, energizing the relay 314 and causing the contacts 384, 385 and 386 to close and the contacts 387 and 388 to open. The closing of contact 384 will complete the circuit from power terminal 382 through contact 384 and contact 406, which is now closed, to coil 319 of relay 313 and from said coil 319 to power terminal 383 causing the contact 389 to open. Current will, however, continue to flow from power terminal 382 to coil 315 through contacts 384, 385 and 386 and to coil 318 through contacts 384, 385, 386, 405 and 407 which is now closed. Current will also continue to flow from power terminal 382 to coil 316 through contacts 384, 385 and 386, and contacts 405 and 411 which are closed; and to coil 318 through contacts 384, 385 and 409 which is closed, and contacts 416 and 407 which are also closed. The energizing of relay 313 will also stop operation of the plunger 28 as pointed out above. When the relay 277 is deenergized, the contact 381 will open, deenergizing the relay 314 and causing the contacts 384, 385 and 386 to open and contacts 387 and 388 to close. The opening of contacts 384, 385 and 386 will interrupt the flow of current through the coils of the relays 308, 309, 311, 312 and 313, causing the contacts 404, 406, 409, 311 and 415 and the holding contacts 405, 407, 411 and 416 to open and causing contacts 389 and 391 to close thereby returning the sequential relay bank to its original condition in readiness for another cycle. The punched jet-cup 75 is then replaced by another jet-cup and the entire cycle repeated by operating the switch 365.

A manually operated switch 417 having a contact 418 in the lead from power terminal 382 permits the flow of current to the sequential relay bank to be interrupted at any time to reset said bank to its starting condition. Similarly, a manually operated switch 419 having a contact 421 in series with the contact 391 permits the operation of the plunger 28 to be halted at any time.

It is to be understood that the foregoing detailed description is merely given by way of illustration and that many variations may be made therein without departing from the spirit of our invention.

Having described our invention, what we desire to secure by Letters Patent is:

1. A positioning system comprising a movable member, a motor for driving said movable member, a plurality of synchros operatively connected to and driven by said movable member, each of said synchros being connected to said movable member through a gear train having a different ratio whereby a given movement of the movable member will move each of said synchros by a different amount, a reference synchro, switch means for connecting one only of said synchros to said reference synchro at a time, and means responsive to the relative position of the reference synchro and the synchro to which the reference synchro is connected to energize the motor to move the movable member to bring the reference synchro and the synchro to which said reference synchro is connected into alignment, the extent of movement of the movable member being different for each synchro connected to the reference synchro and dependent thereon.

2. A positioning system comprising a rotatable member, a motor for rotating said rotatable member, a plurality of synchros operatively connected to and driven by said rotatable member, each of said synchros being connected to said rotatable member through a gear train having a different ratio whereby a given rotation of the rotatable member will move each of said synchros by a different amount, a reference synchro, switch means for connecting one only of said synchros to said reference synchro at a time, means responsive to the relative position of the reference synchro and the synchro to which the reference synchro is connected to energize the motor to rotate the rotatable member to bring the reference synchro and the synchro to which said reference synchro is connected into alignment, the extent of rotation of the rotatable member being different for each synchro connected to the reference synchro and dependent thereon.

3. A positioning system comprising a rotatable member, a motor for driving said rotatable member, a plurality of ring gears each having a different pitch diameter connected to said rotatable member, a plurality of synchros connected through gearing to said ring gears and driven by said rotatable member, the gear train between each of said synchros and the rotatable member having a different ratio whereby a given rotation of the rotatable member will move each of said synchros by a different amount, a reference synchro, switch means for connecting one only of said synchros to said reference synchro at a time, means responsive to the relative position of the reference synchro and the synchro to which the reference synchro is connected to energize the motor to rotate the rotatable member to bring the reference synchro and the synchro to which said reference synchro is connected into alignment, the extent of rotation of the rotatable member being different for each synchro connected to the reference synchro and dependent thereon.

4. A punch for automatically locating the apertures in a jet-cup, comprising an anvil for engaging and supporting the jet-cup, a press for repeatedly bringing a punch point into contact with the jet-cup, and means for moving the anvil between successive contacts of the jet-cup with the punch point, said moving means comprising a motor for driving said anvil, a plurality of synchros operatively connected to and driven by said anvil, each of said synchros being connected to and driven by said anvil through a gear train having a different ratio whereby a given movement of the anvil will drive each of said synchros by a different amount, a reference synchro, switch means for connecting one only of said synchros to said reference synchro at a time, and means responsive to the relative position of the reference synchro and the synchro to which the reference synchro is connected to energize the motor to drive the anvil to bring the reference synchro and the synchro to which said reference synchro is connected into alignment, the extent of movement of the anvil and the spacing between the successive contacts of the punch point and the jet-cup being different for each synchro connected to the reference synchro and dependent thereon.

5. A punch for automatically locating the apertures in a jet-cup, comprising an anvil for engaging and supporting the jet-cup, a press for repeatedly bringing a punch point into contact with the jet-cup at points located about the periphery of a circle, and means for rotating the anvil between successive contacts of the jet-cup with the punch point, said moving means comprising a motor for rotating said anvil, a plurality of synchros operatively connected to and driven by said anvil, each of said synchros being connected to said anvil through a gear train having a different ratio whereby a given rotation of the anvil will move each of said synchros by a different amount, a reference synchro, switch means for connecting one only of said synchros to said reference synchro at a time, means responsive to the relative position of the reference synchro and the synchro to which the reference synchro is connected to energize the motor to rotate the anvil to bring the reference synchro and the synchro to which said reference synchro is connected into alignment, the extent of rotation of the anvil and the spacing between the successive contacts of the punch point and the jet-cup being different for each synchro connected to the reference synchro and dependent thereon.

6. A punch for automatically locating the apertures in a jet-cup, comprising an anvil for engaging and supporting the jet-cup, a press for repeatedly bringing a punch point into contact with the jet-cup at points located about the periphery of a circle, and means for rotating the anvil between successive contacts of the jet-cup with the punch point, said moving means comprising a motor for rotating said anvil, a plurality of ring gears each having a different pitch diameter connected to said anvil, a plurality of synchros connected through gearing to said ring gears and driven by said anvil, the gear train between each of said synchros and the anvil having a different ratio whereby a given rotation of the anvil will move each of said synchros by a different amount, a reference synchro, switch means for connecting one only of said synchros to said reference synchro at a time, means responsive to the relative position of the reference synchro and the synchro to which the reference synchro is connected to energize the motor to rotate the anvil to bring the reference synchro and the synchro to which said reference synchro is connected into alignment, the extent of rotation of the anvil and the spacing between the successive contacts of the punch point and the jet-cup being different for each synchro connected to the reference synchro and dependent thereon.

References Cited in the file of this patent

UNITED STATES PATENTS

| Number | Name | Date |
| --- | --- | --- |
| 163,904 | Westgate | June 1, 1875 |
| 1,514,353 | Thomas | Nov. 4, 1924 |
| 1,612,120 | Hildebrand | Dec. 28, 1926 |
| 1,670,648 | Beyer | May 22, 1928 |
| 2,115,402 | Spoonbrook | Apr. 26, 1938 |
| 2,130,235 | Heyman | Sept. 13, 1938 |
| 2,148,221 | Schneider | Feb. 21, 1939 |
| 2,194,170 | Newell | Mar. 19, 1940 |
| 2,379,028 | Morgenstern | June 26, 1945 |
| 2,381,039 | Churchill | Aug. 7, 1945 |
| 2,403,605 | Lesnick | July 9, 1946 |
| 2,414,384 | Mosely | Jan. 14, 1947 |
| 2,436,172 | Kent | Feb. 17, 1948 |
| 2,475,217 | Bernas | July 5, 1949 |
| 2,533,914 | Brandt | Dec. 12, 1950 |
| 2,536,850 | Kutzler | Jan. 2, 1951 |
| 2,537,498 | Wickesser | Jan. 9, 1951 |
| 2,543,950 | Yardeny et al. | Mar. 6, 1951 |
| 2,567,202 | Goertz | Sept. 11, 1950 |
| 2,582,221 | Belsey et al. | Jan. 15, 1952 |
| 2,584,897 | Marco | Feb. 5, 1952 |